United States Patent
Gu et al.

(10) Patent No.: US 8,794,368 B2
(45) Date of Patent: Aug. 5, 2014

(54) MOTOR ASSISTED ROTATING WHEEL MECHANISM

(75) Inventors: Huan-Lung Gu, Hsinchu (TW);
Yee-Pien Yang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/474,161

(22) Filed: May 17, 2012

(65) Prior Publication Data

US 2013/0092464 A1    Apr. 18, 2013

(30) Foreign Application Priority Data

Aug. 23, 2011  (TW) .............................. 100130074 A (51) Int. Cl.
*B62M 7/02*    (2006.01)
*B62M 6/55*    (2010.01)

(52) U.S. Cl.
CPC ...................................... *B62M 6/55* (2013.01)
USPC ................. 180/206.4; 180/205.1; 180/206.1; 180/206.5

(58) Field of Classification Search
USPC ................................. 180/206.4, 205.1, 206.1
See application file for complete search history.

(56) References Cited

U.S. PATENT DOCUMENTS

| | | | |
|---|---|---|---|
| 3,483,458 A | 12/1969 | Kirk | |
| 3,643,140 A | 2/1972 | Allison | |
| 5,180,115 A * | 1/1993 | Stein | 242/530.3 |
| 5,845,727 A * | 12/1998 | Miyazawa et al. | 180/206.4 |
| 6,196,347 B1 * | 3/2001 | Chao et al. | 180/206.2 |
| 6,296,072 B1 | 10/2001 | Turner | |
| 6,629,574 B2 * | 10/2003 | Turner | 180/206.4 |
| 6,672,418 B1 * | 1/2004 | Makino | 180/206.3 |
| 7,370,720 B2 * | 5/2008 | Kokatsu et al. | 180/206.4 |
| 7,766,114 B2 * | 8/2010 | Lee et al. | 180/206.4 |
| 7,901,118 B2 | 3/2011 | Chia-Li et al. | |

(Continued)

FOREIGN PATENT DOCUMENTS

| | | |
|---|---|---|
| CN | 2675543 Y | 2/2005 |
| CN | 101641253 A | 2/2010 |

(Continued)

OTHER PUBLICATIONS

Yan et al. "Axial-Flux Permanent Magnet Brushless Motor for Slim Vortex Pumps", IEEE Transactions on Magnetics, vol. 45, No. 10, pp. 4732-4735, Oct. 2009.

(Continued)

*Primary Examiner* — Kevin Hurley
*Assistant Examiner* — Michael Stabley
(74) *Attorney, Agent, or Firm* — Rabin & Berdo, P.C.

(57) ABSTRACT

A motor-assisted rotating wheel mechanism includes a rotating wheel, a rotating axle and an auxiliary motor. The rotating axle is rotationally disposed on a frame body and has two cranks with force-receiving members disposed at the two ends thereof, for allowing the force received by the force-receiving members to provide a rotational force to drive the rotating wheel to rotate and thus facilitate the auxiliary motor to output power, wherein the auxiliary motor is disposed between the two cranks disposed at the two ends of the rotating axle, and wherein the auxiliary motor includes a magnetic field having the same axle center as or parallel to the axle center, thereby facilitating the auxiliary motor to output power in cooperation with the rotating power provided by the rotating axle to synchronically drive the rotating wheel.

17 Claims, 9 Drawing Sheets

(56) References Cited

U.S. PATENT DOCUMENTS

| | | | |
|---|---|---|---|
| 2009/0200096 A1 | 8/2009 | Pittman | |
| 2010/0051373 A1* | 3/2010 | Lee et al. | 180/205 |
| 2011/0303474 A1* | 12/2011 | Kimmich et al. | 180/206.3 |
| 2013/0277131 A1* | 10/2013 | Becker | 180/206.4 |

FOREIGN PATENT DOCUMENTS

| | | |
|---|---|---|
| CN | 201678014 U | 12/2010 |
| JP | 2000185685 | 7/2000 |
| TW | M290853 U | 5/2006 |
| TW | I264399 B | 10/2006 |
| TW | I265896 B | 11/2006 |
| TW | M301184 | 11/2006 |
| TW | I296596 B | 5/2008 |
| TW | I308892 B | 4/2009 |
| WO | WO-8202803 A1 | 8/1982 |

OTHER PUBLICATIONS

Rahim et al., "Design of Axial Flux Permanent Magnet Brushless DC Motor for Direct Drive of Electric Vehicle", Power Engineering Society General Meeting, pp. 1-6, Jun. 2007.

Aydin, et al., "A New Axial Flux Surface Mounted ermanent Magnet Machine Capable of Field Control", 37th IAS Annual Meeting, vol. 2, pp, 1250-1257, Oct. 2002.

Chalmers, "Developments in electrical machines using permanent magnets", Journal of Magnetism and Magnetic Materials, pp. 131-132, 1996.

TW OA, Jul. 24, 2013.

China Patent Office, Office Action, Patent Application Serial No. CN 201210146728.6, Dec. 30, 2013, China.

European Patent Office, Office Action issued on May 22, 2014.

\* cited by examiner

MOTOR ASSISTED ROTATING WHEEL MECHANISM

BACKGROUND OF THE APPLICATION

1. Field of the Disclosure

The application relates to a motor assisted rotating wheel mechanism, and, more particularly, to a motor assisted rotating wheel mechanism with an axial magnetic flux.

2. Background

Most of common motor bicycles are installed with their own auxiliary motor on the axle of front or rear wheel, and there are also motor bicycles with an auxiliary motor installed on the center of the frame body, that is, on the crank axle of the pedals.

Installing the auxiliary motor on the center of the frame body is known as a mid-motor motor bicycle, because the mid-motor motor bicycle can transmit the output power to a chain wheel on the crank axle. Compared to the motor bicycle installed with the auxiliary motor on the front or rear wheel, the mid-motor motor bicycle is more directly and suitably matched with exertion of user. Current mid-motor motor bicycles, as disclosed in U.S. Pat. No. 6,296,072, TW Patent No. I308892, TW Patent No. I265896, TW Patent No. I264399, and TW Patent No. I296596, employ the auxiliary motor with a radial magnetic flux design where the electromagnetic field generated by the auxiliary motor is perpendicular to the center of rotating axle.

The patents mentioned above have issues related to a trade-off between the volume and the twisting force. Specifically, when a larger output of twisting force is required, the auxiliary motor with motor design of radial magnetic flux has a wider size, and wider size means that a bicycle designer needs to reserve a larger space for installing the auxiliary motor. Accordingly, the appearance design of a motor bicycle is impeded and the product development of a motor bicycle is adversely affected. On the other hand, reducing the width of the auxiliary motor with a radial magnetic flux design for designing desired appearance of bicycle would, however, correspondingly reduce the output of the twisting force, and related decelerating gear set is also necessary for motor bicycle designer to increase the output of twisting force. Equipping additional decelerating gear set results in the increase of the total cost of the motor bicycle and complexity of equipment would raise.

SUMMARY OF THE APPLICATION

The present disclosure provides a motor assisted rotating wheel mechanism, including: a frame body; a rotating wheel rotationally connected to the frame body; a rotating axle installed in the frame body, with two cranks having force-receiving members respectively installed on both ends of the rotating axle to provide a rotational power to rotate the rotating wheel by the force-receiving members; and an auxiliary motor installed between the two cranks on the two ends of the rotating axle and having an electromagnetic field coaxial with the axial core of the rotating axle, such that the auxiliary motor outputs power in cooperation with the rotational power provided by the rotating axle to synchronically drive the rotating wheel to rotate.

The present disclosure also provides a motor assisted rotating wheel mechanism, including: a rotating axle installed in the frame body, with two cranks having force-receiving members respectively installed on both ends of the rotating axle to provide a rotational power to rotate the rotating wheel by the force-receiving members; and an auxiliary motor installed between the two cranks on the two ends of the rotating axle and having an electromagnetic field parallel to the axial core of the rotating axle, such that the auxiliary motor outputs power in cooperation with the rotational power provided by the rotating axle to synchronically drive the the rotating wheel to rotate.

The auxiliary motor designed according to the present disclosure can provide an electromagnetic field coaxial with or parallel to the axle core of the rotating axle, that is, manufacturing the auxiliary motor with a motor design of radial magnetic flux design can be employed for designing and manufacturing the auxiliary rotor. Thus, not only overall design of appearance would not be affected by a smaller width of the crank axle, but also sufficient twisting force can be provided to match with the exertion of the user to achieve both volume and twisting force of the mid-motor design.

BRIEF DESCRIPTION OF DRAWINGS

The present disclosure will become more fully understood from the detailed description given herein below for illustration only, and thus are not limitation of the present disclosure, and wherein.

DETAILED DESCRIPTION OF PREFERRED EMBODIMENTS

The following explains this application by specific embodiments, whoever has ordinary knowledge in the technical field of this application can easily understand advantages and efficacy of the application from the specification. This application can also be implemented or applied by other different embodiments.

Figure 1:
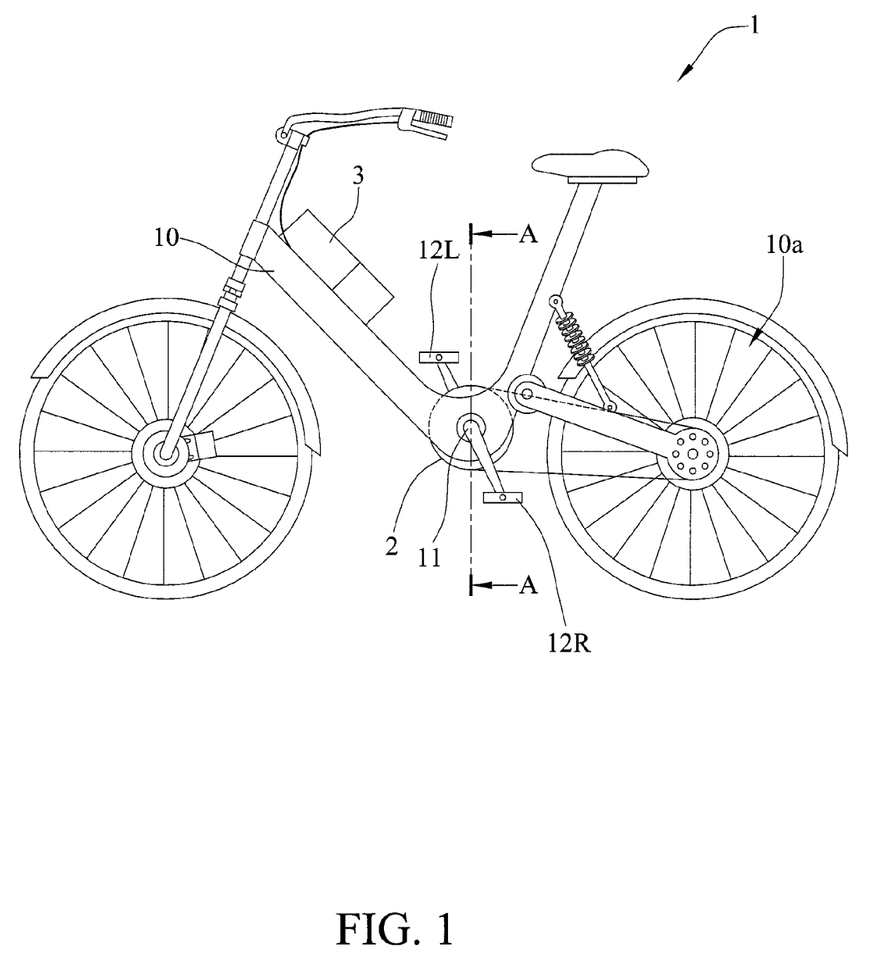
FIG. 1 is an application context diagram of the motor assisted rotating wheel mechanism according to the present disclosure.
Figure 2:
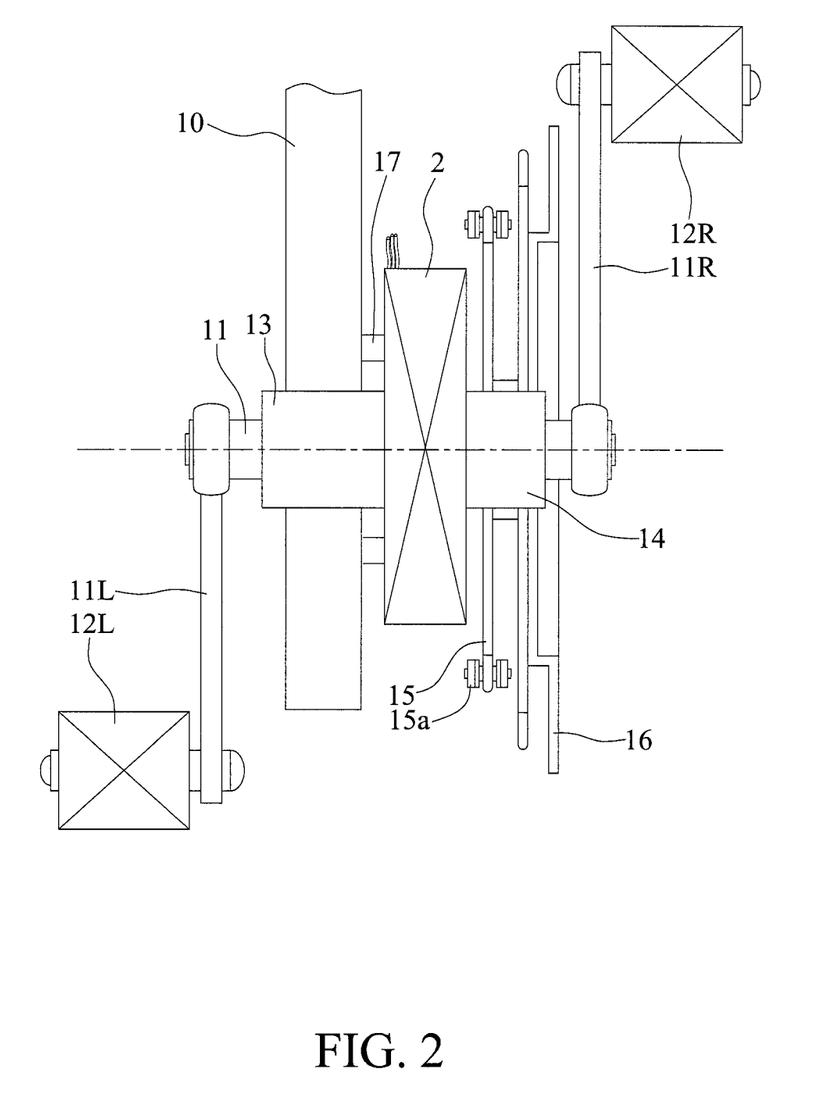
FIG. 2 is a schematic cross-sectional diagram along a cutting line A-A shown in FIG. 1.

FIG. 1 is an application context diagram of the motor assisted rotating wheel mechanism according to the present disclosure. FIG. 2 is the schematic cross-sectional diagram along a cutting line A-A shown in FIG. 1.

The motor assisted rotating wheel mechanism includes a rotating wheel 10a, a rotating axle 11 and an auxiliary motor 2. The rotating wheel 10a illustrates the rear wheel of the motor bicycle 1. In other embodiment, the rotating wheel 10a can also be the front wheel of the motor bicycle 1 or integrally formed with the rotating axle 11.

The rotating axle 11 can be rotationally installed on the frame body 10 through the rotating axle seat 13, and be installed with two cranks 11R, 11L having the force-receiving members 12R, 12L, respectively, to provide rotational power for rotating the rotating wheel 10a by the force-receiving members 12R, 12L. In the embodiment, the rotating axle 11 and the cranks 11R, 11L constitute a crank axle, while the force-receiving members 12R, 12L are illustrated as pedals for stepping thereon. The rotating axle 11 can drive the rotation of the rotating wheel 10a to rotate by a first driving device and the driving device seat 14, while the first driving device is illustrated as a matched chain wheel 15 and chain 15a, rotationally installed on the rotating axle 11 by the driving device seat 14. Of course, the first driving device can use matching strap and pulley. Second, the outer side of the first driving device can be equipped with a baffle 16 to prevent user from heedlessly touching the first driving device.

The auxiliary motor 2 is installed between two cranks 11R, 11L on the two ends of the rotating axle 11, generating an electromagnetic field coaxial with the axle core of rotating axle 11, while the auxiliary motor 2 outputs power in cooperation with the rotational power provided by the rotating axle 11, so as to synchronically drive the rotating wheel 10a to rotate. In the embodiment, the auxiliary motor 2 can be installed on the lateral side of the frame body 10 by at least a securing device 17 and electrically connected with the battery and the controller 3 to drive the auxiliary motor 2, while the battery and the controller 3 can be installed on the frame body 10 or in the frame body 10.

Figure 3:
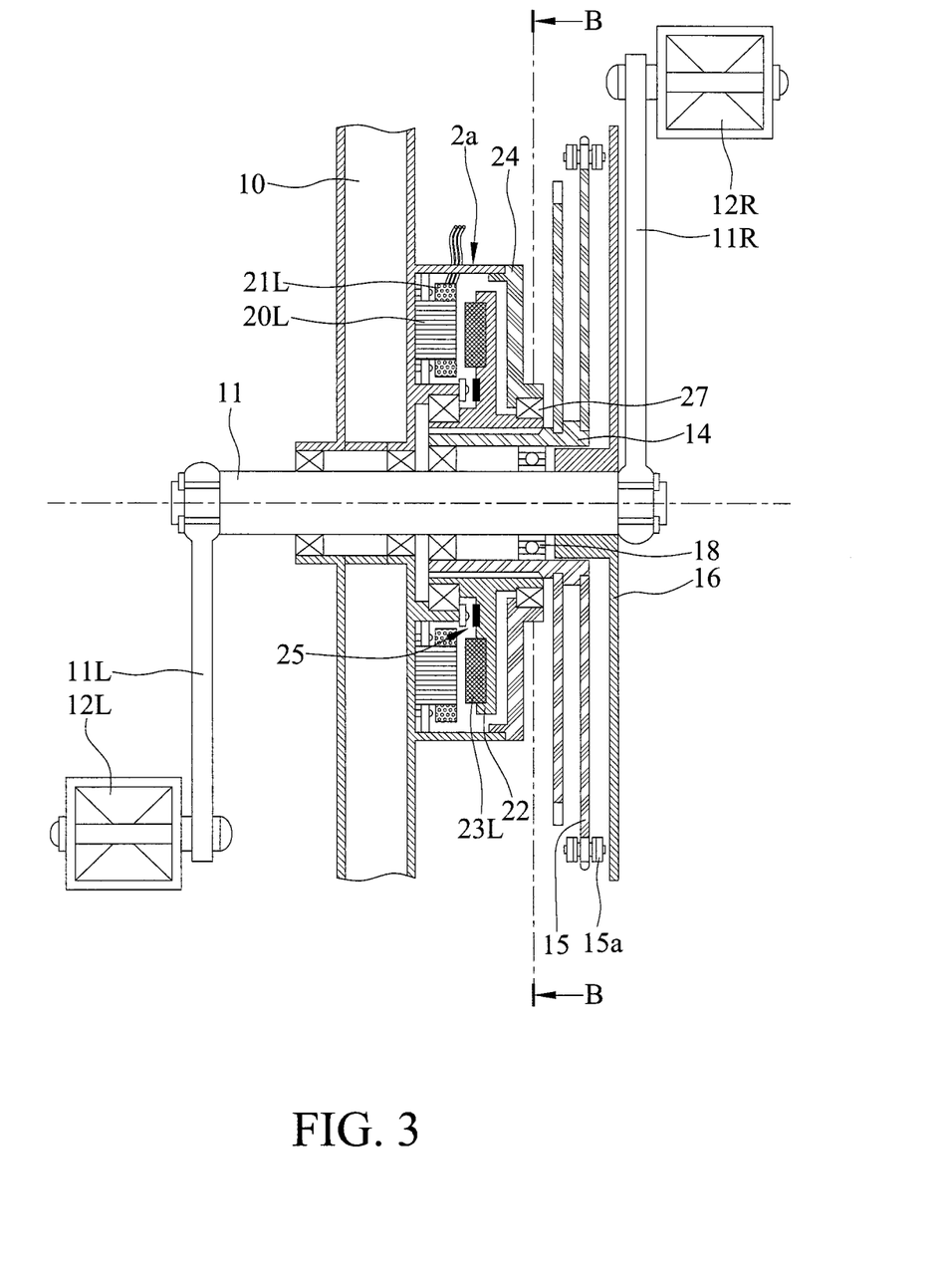
FIG. 3 is another schematic cross-sectional diagram of the auxiliary motor forming action surface of single magnetic flux of internal rotor in this application.

Referring now to FIG. 3, the auxiliary motor 2a has a rotor installed in the central region inside the auxiliary motor 2a and having a rotor seat 22 and at least a permanent magnet 23L embedded in the rotor seat 22, and a stator installed on the outer region inside the auxiliary motor 2a and having a stator core formed by silicon steel slices 20L and a winding set 21L wound around the stator core. The winding set 21L can be connected to the external battery and controller 3. Specifically, the rotor seat 22 can connect the driving device seat 14 through, such as, profile shaft or other connection methods. Of course, the rotor seat 22 and the driving device seat 14 can be kinetically coupled together by, such as, key connection or buckles. Moreover, the rotor seat 22 can be coupled to the casing 24 through the bearing 27.

Besides, from the embodiments illustrated in FIG. 3 it can be known that the auxiliary motor 2a is of an internal rotor, and the casing 24 is used as the stator seat, and there is only one stator having a stator core formed by silicon steel slices 20L and a winding set 21L wound around the stator core installed on the left region inside the auxiliary motor 2a, a single active surface of magnetic flux is formed. In actual implementation, the casing 24 can be formed by a magnetic material such as carbon steel, and the gap between rotor (the rotor seat 22 and the permanent magnet 23L) and the stator (the stator core formed by the silicon steel slices 20L and the winding set 21L) can be smaller than 0.5 mm to avoid excessively high magnetic reluctance. The stator and rotor can be installed with corresponding position sensors 25, and in the embodiment, the position sensors 25 are a Hall effect sensor near the stator side and magnet plate installed on the rotor seat 22. In consideration of reducing the cost, the position sensor 25 is not necessary to be installed, but, instead, control can be achieved by the variation of electromotive or voltage signal generated by the winding set 21L after the rotor has been indirectly activated by man power.

Figure 4:
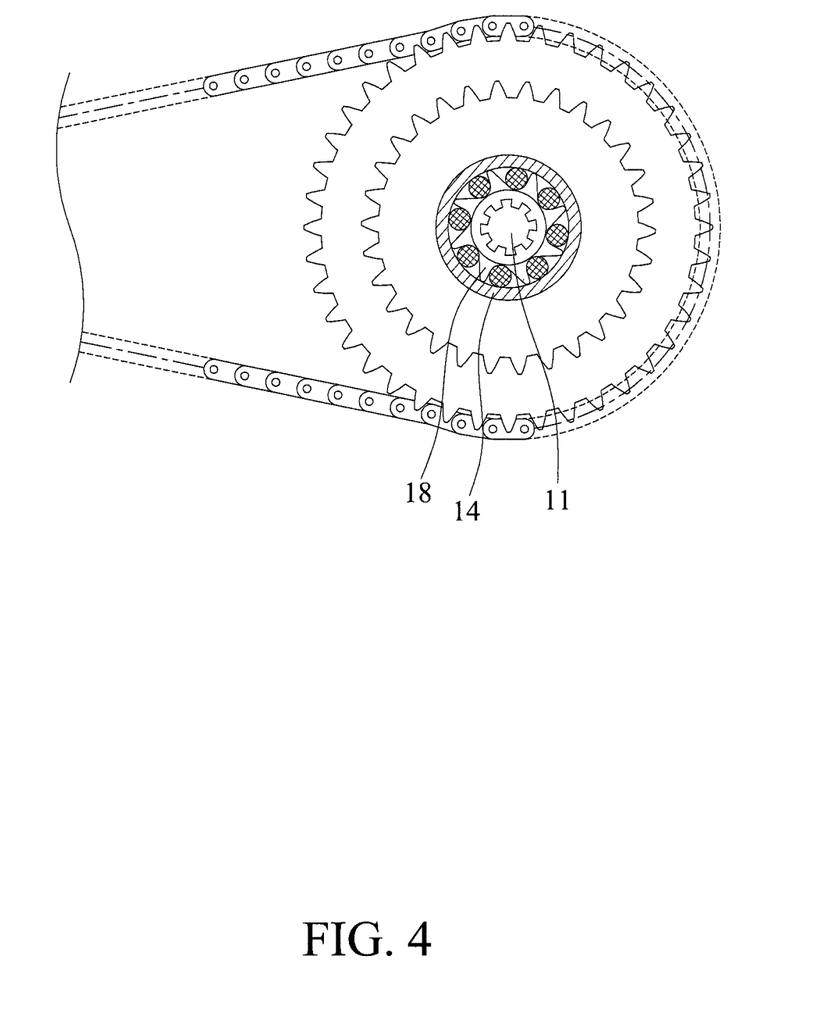
FIG. 4 is a schematic structure diagram of a unidirectional ratchet wheel along a cutting line B-B in FIG. 3.

FIG. 4 is a schematic cross-sectional diagram along a cutting line B-B shown in FIG. 3. In the embodiment, the rotating axle 11 can be coupled to the chain wheel 15 by the unidirectional ratchet 18, and it can be also coupled to a pulley by the unidirectional ratchet 18. Because the unidirectional ratchet 18 would match with a plurality of rotating balls, only the positive direction of rotation between the driving device seat 14 and the rotating axle 11 is allowed.

Figure 5:
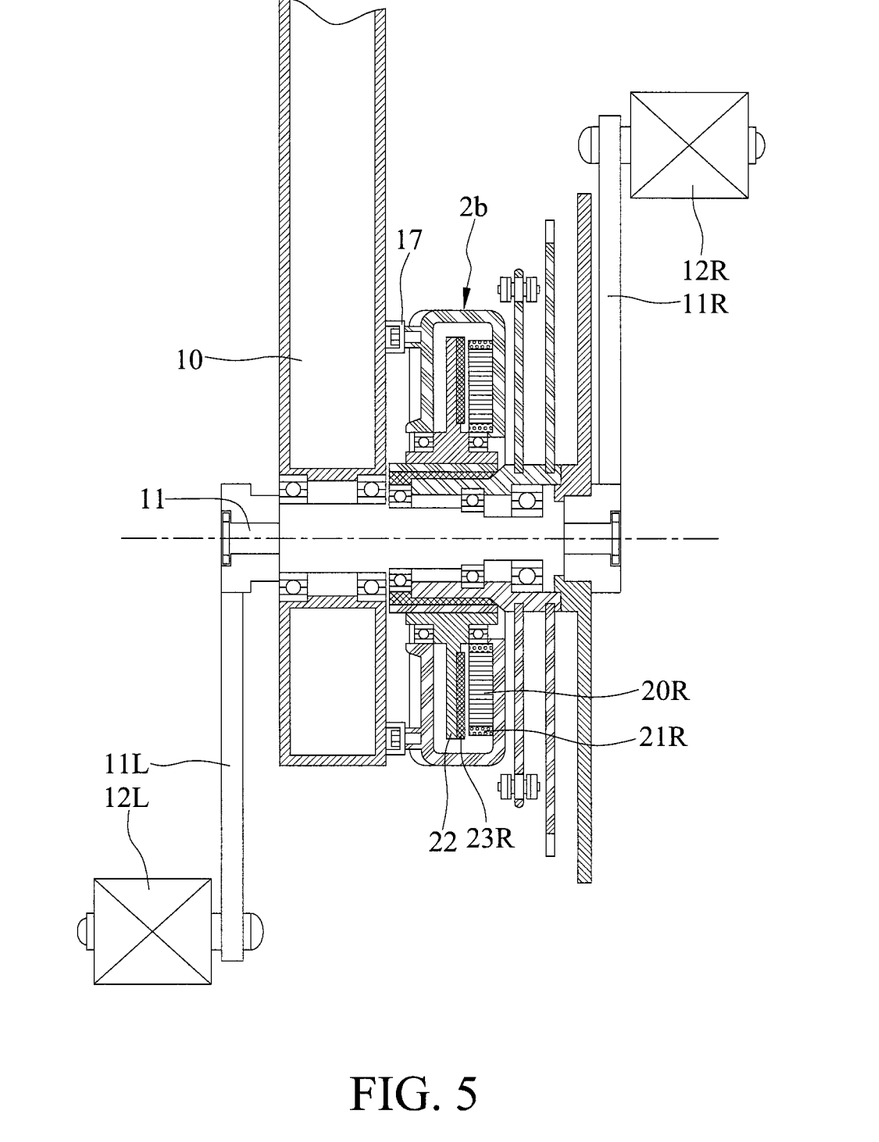
FIG. 5 is another schematic cross-sectional diagram of the auxiliary motor forming action surface of a single magnetic flux of an internal rotor according to the present disclosure.

Internal rotor type can also be accomplished by other methods. As illustrated in FIG. 5, the rotor has the rotor seat 22 disposed in the central region inside the auxiliary motor 2b and a permanent magnet 23R embedded in the right side of the rotor seat 22, and the stator can be a silicon steel slice 20R secured in the right side of the auxiliary motor 2b and a winding set 21R wound around the stator core formed by the silicon steel slices 20R. As FIG. 6 illustrates, the rotor can have rotor seat 22 disposed in the central region inside the auxiliary motor 2c and permanent magnets 23R, 23L embedded in the right and left side of the rotor seat 22, and the stator can have a stator core formed by silicon steel slices 20R secured in the right side of the auxiliary motor 2c together with a winding set 21R wound around the stator core formed by the silicon steel slices 20R, and a stator core formed by silicon steel slices 20L secured in the left side of the auxiliary motor 2c together with a winding set 21L wound around the stator core formed by the silicon steel slices 20L.

Figure 6:
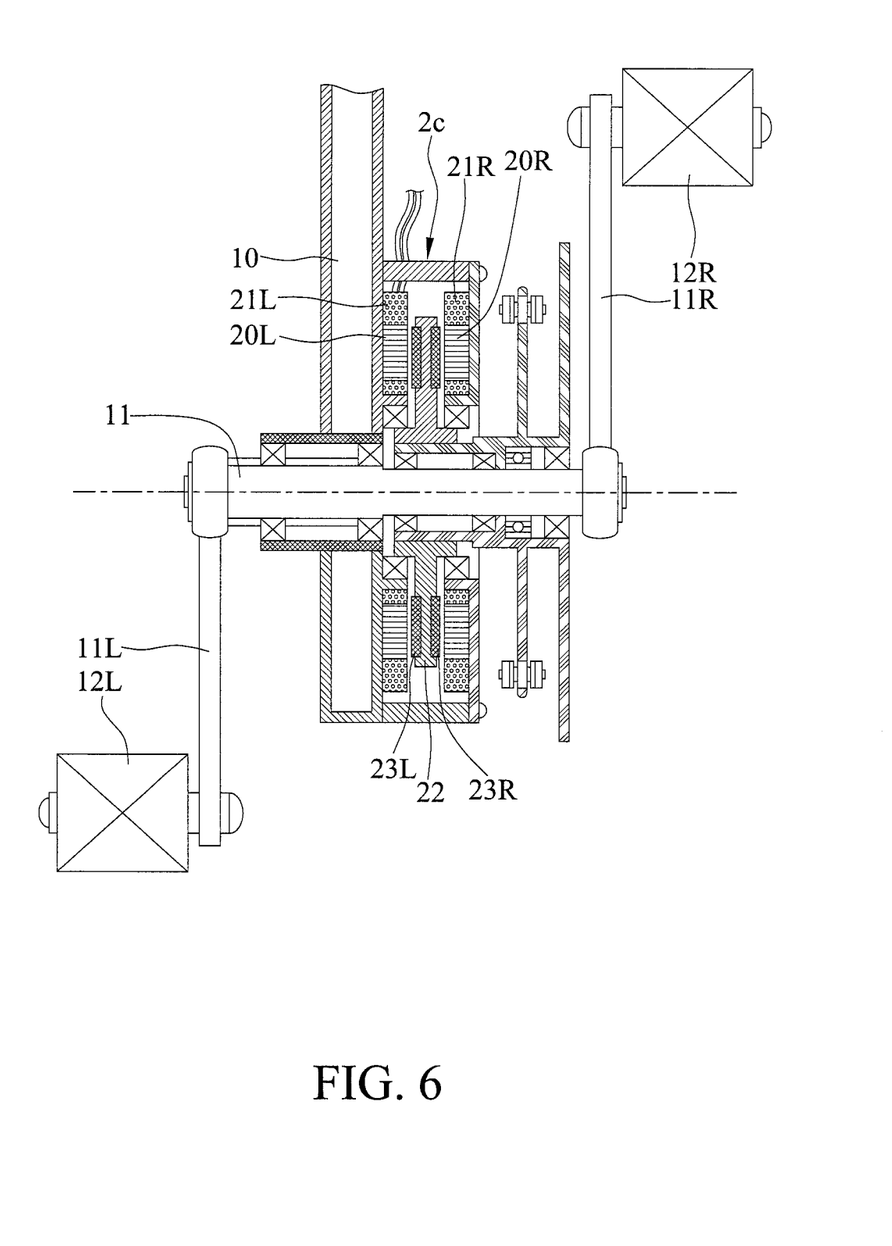
FIG. 6 is a schematic cross-sectional diagram of the auxiliary motor forming action surface of a double magnetic flux of an internal rotor according to the present disclosure.

Notice that although the structural design in FIG. 5 and FIG. 6 are in internal rotor form, the design in FIG. 5 has a single active surface of magnetic flux, while the design in FIG. 6 has two active surfaces of magnetic flux, and the position sensor can be used in this implementation. Moreover, when the auxiliary motor according to the present disclosure has two active surfaces of magnetic flux, because the electromagnetic filed of the axial direction can be leftward or rightward, the electromagnetic field generated by corresponding winding sets 21L, 21R on two lateral sides is advantageous to be in the same direction. Of course, if the electromagnetic field of the winding sets 21L, 21R are of different directions, the magnetic poles of the opposing permanent magnets 23L, 23R on the two lateral sides of the rotor seat 22 are required to have same magnetic poles face each other. This arrangement is for when a permanent magnet of high magnetic flux density is installed on the rotor seat 22, preventing peeling off, mistake and collision due to excessive magnetic suction from occurrence.

Figure 7:
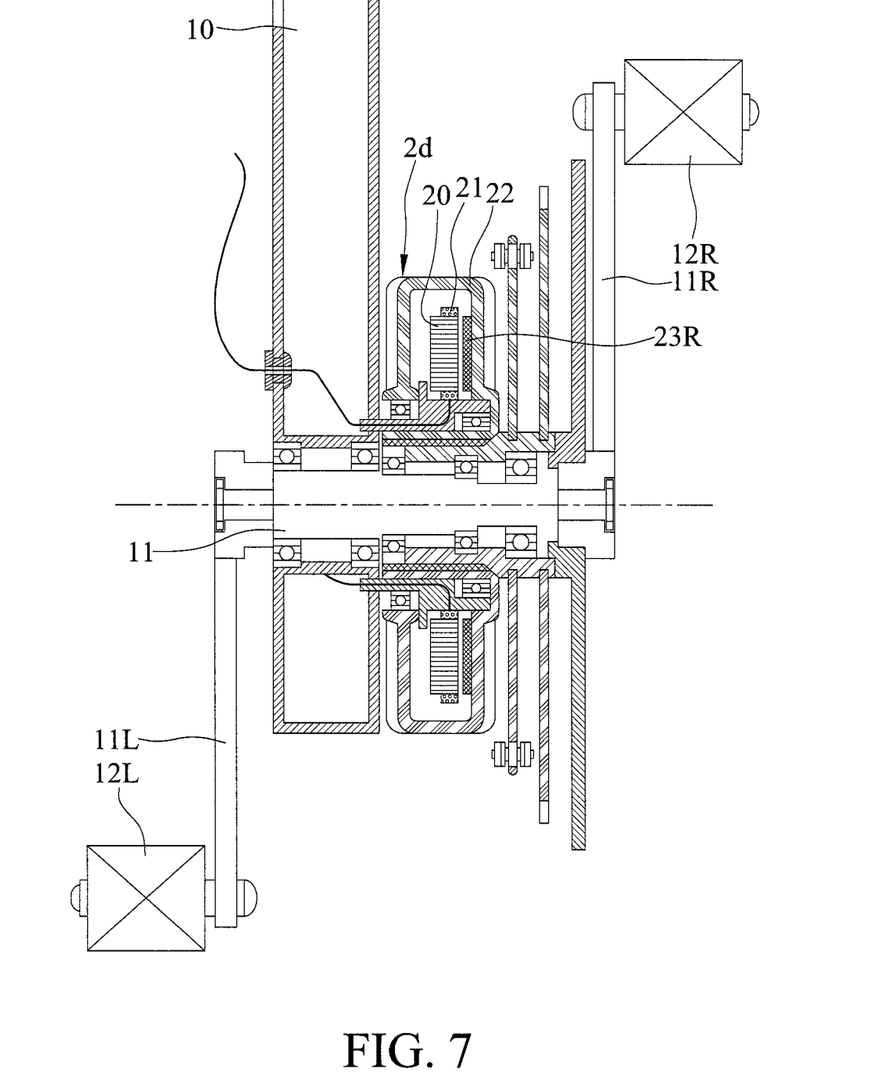
FIG. 7 is a schematic cross-sectional diagram of the auxiliary motor forming action surface of the single magnetic flux of an external rotor according to the present disclosure.

The auxiliary motor according to the present disclosure not only can be designed as in an internal rotor form, but also can be designed as in an external rotor form. First, as illustrated in FIG. 7, the rotor can have the rotor seat 22 in a round plate shape disposed in the central region inside the auxiliary motor 2d and a permanent magnet 23R installed on the right side region inside the auxiliary motor 2d and embedded in the rotor seat 22, while the stator can have a stator core formed by the silicon steel slices 20 disposed in the central region inside the auxiliary motor 2d and the winding set 21 wound around the stator core formed by the silicon steel slices 20. In the illustration of FIG. 7, the auxiliary motor 2d has a single active surface of magnetic flux, while the rotor seat 22 can be connected to the seat for carrying the stator core formed by the silicon steel slices 20 and the winding set 21 by a unidirectional ratchet. Of course, position sensors can also be installed thereon.

Figure 8:
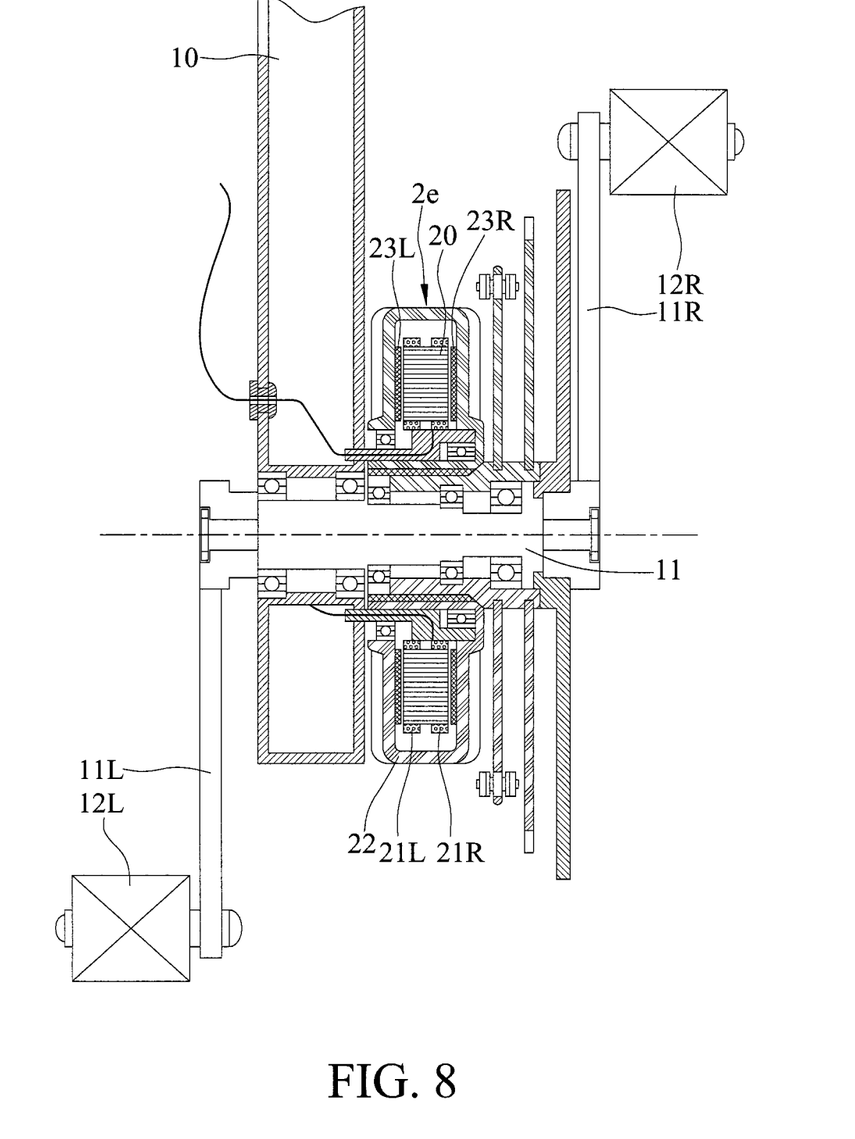
FIG. 8 is a schematic cross-sectional diagram of the auxiliary motor forming action surface of a double magnetic flux of an external rotor according to the present disclosure.

As FIG. 8 illustrates, the rotor can have the rotor seat in a round plate shape and permanent magnets 23R, 23L embedded in the rotor seat 22 on both sides thereof inside the auxiliary motor 2e, while the stator can have a stator core formed by silicon steel slices 20 in the central region inside the auxiliary motor 2e and a winding set 21 wound around the stator core formed by the silicon steel slices 20. The difference between FIG. 8 and FIG. 7 lies in that the auxiliary motor 2e of FIG. 8 has two active surfaces of magnetic flux.

Figure 9:
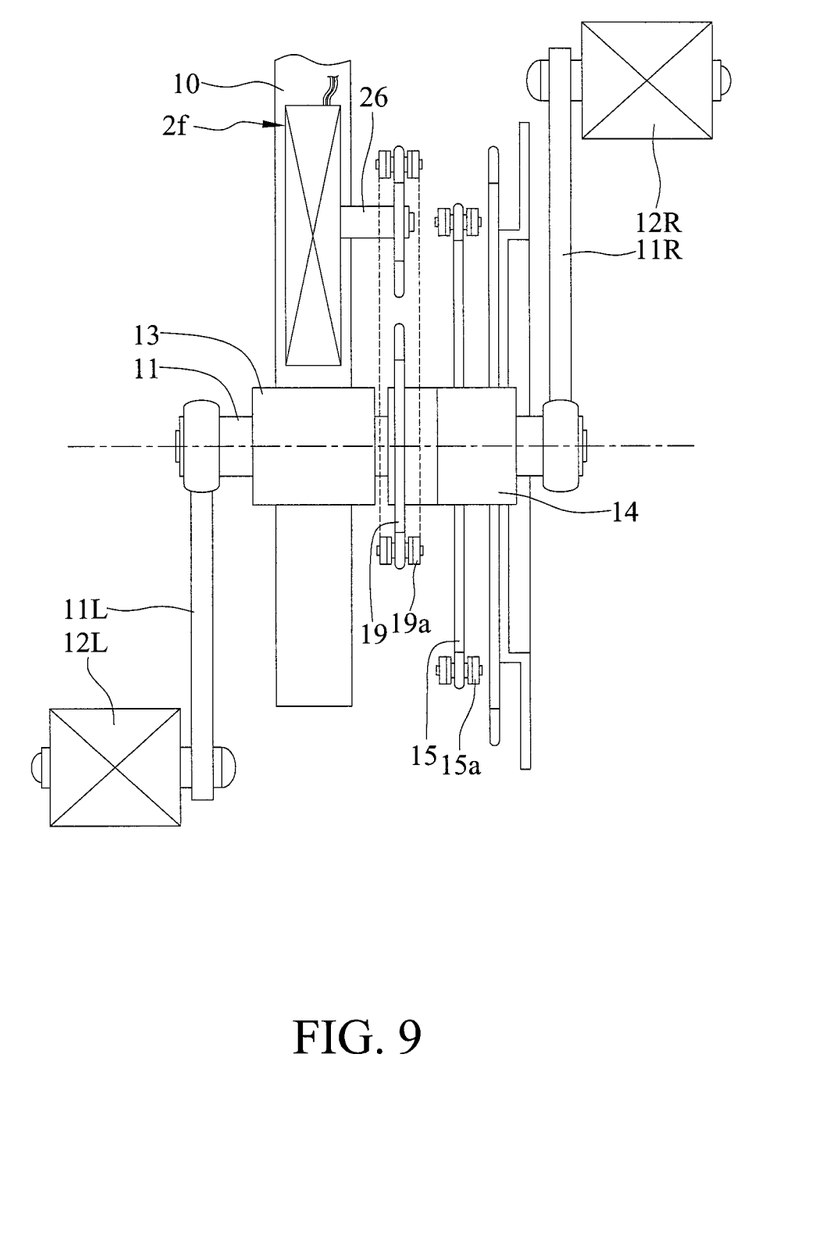
FIG. 9 is a schematic structure diagram of the auxiliary motor forming an electromagnetic field with an axle core parallel to the rotating axle according to the present disclosure.

Whichever a single active surface or double active surfaces of magnetic flux or is in an internal rotor form or an internal stator form, it is designed to allow the electromagnetic field generated by the winding set to be coaxial with the rotating axle 11. However, for meeting different requirements for various applications, the auxiliary motor can be designed to have the electromagnetic field parallel to the axle core of the rotating axle 11. Of course, the auxiliary motor in the aforementioned embodiments can have a plurality of active surfaces of magnetic flux. As illustrated in FIG. 9, the auxiliary motor 2f is likewise installed between the two cranks 11R, 11L on the two ends of the rotating axle 11 with an electromagnetic field parallel to the rotating axle 11, while the output power of the auxiliary motor 2f is managed to the in cooperation with the rotational power provided by the rotating axle 11 to synchronically drive the rotating wheel 10a to rotate.

Different from the embodiment is that the auxiliary motor is optionally installed inside the frame body 10 and the auxiliary motor 2f provides output power by the exposed rotor axle 26 and a second driving device, with the first driving device (the chain wheel 15 and chain 15a) and the second driving device rotationally installed on the rotating axle 11 by driving device seat 14. In the embodiment, the second driving device can be composed of a matching chain 19a and a chain wheel 19, or a matching strap and a pulley. Notice that the auxiliary motor 2f can be designed in an internal rotor form, or in an external rotor form, with a single active surface or with a plurality of active surfaces and with position sensors or with a unidirectional ratchet.

Compared to the prior art, because the auxiliary motor according to the present disclosure can provide an electromagnetic field coaxial with or parallel to the axle core of the rotating axle. In other words, the present disclosure can manufacture the auxiliary motor of radial magnetic flux by the aforementioned embodiments, not only the auxiliary motor with smaller width can be installed on the cranks without limiting overall design, but also it can provide sufficient output of twisting force to match exertion of user without installation of a decelerating motor. Accordingly, both requirements of volume and twisting force are achieved without various issues of the conventional mid-motor motor bicycle of radial magnetic flux.

The embodiments are only illustratively explain the theory and efficacy of this application rather than limiting this application. Whoever has ordinary knowledge in the technical field of this application can modify or alter the application without violation of the spirit and scope in the application. Thus, rights protection of the application should be listed as the following claims.

The invention claimed is:

1. A motor assisted rotating wheel mechanism, comprising:
   a frame body;
   a rotating wheel rotationally connected to the frame body;
   two cranks, each of the two cranks having a force-receiving member;
   a rotating axle disposed in the frame body with two ends connected with the two cranks, the force-receiving members receiving forces and providing a rotating power that drives the rotating wheel to rotate via the rotating axle;
   an auxiliary motor having a casing and being disposed between the two cranks, the auxiliary motor providing an electromagnetic field that is parallel to an axle core of the rotating axle, wherein output power of the auxiliary motor combines with the rotating power provided by the rotating axle to synchronically drive the rotating wheel to rotate, and wherein the auxiliary motor is equipped with a rotor and a stator, and the rotor is located in a central region inside the auxiliary motor while the stator is located on an outer region inside the auxiliary motor, so as to form one or more active surfaces of magnetic flux, wherein the rotor has a permanent magnet and a rotor seat for carrying the permanent magnet;
   a bearing, the rotor seat being coupled to the casing of the auxiliary motor through the bearing;
   one of a profile shaft, a key connection and buckles;
   a first driving device; and
   a driving device seat,
   wherein the rotating axle provides the rotating power for driving the rotating wheel to rotate through the first driving device and the driving device seat, and the rotor seat is coupled to the driving device seat through the one of the profile shaft, the key connection and the buckles.

2. The motor assisted rotating wheel mechanism of claim 1, wherein
   the first driving device is rotationally installed on the rotating axle via the driving device seat.

3. The motor assisted rotating wheel mechanism of claim 1, further comprising:
   one of a chain wheel and a pulley; and
   a unidirectional ratchet wheel,
   wherein the rotating axle connects to the one of the chain wheel and the pulley through the unidirectional ratchet wheel.

4. The motor assisted rotating wheel mechanism of claim 1, wherein the stator has
   a stator core, formed by silicon steel slices, and
   a winding set wound around the stator core.

5. The motor assisted rotating wheel mechanism of claim 1, wherein the auxiliary motor further comprises a position sensor installed in
   the stator,
   the rotor,
   or both of the stator and the rotor.

6. The motor assisted rotating wheel mechanism of claim 1, further comprising a securing device, wherein the auxiliary motor is installed on lateral sides of the frame body through the securing device.

7. The motor assisted rotating wheel mechanism of claim 1, further comprising a rotating axle seat, wherein the rotating axle is rotationally installed on the frame body through the rotating axle seat.

8. A motor assisted rotating wheel mechanism, including:
   a frame body;
   a rotating wheel rotationally connected to the frame body;
   two cranks, each of the two cranks having a force-receiving member;
   a rotating axle installed on the frame body, with two ends connected to the two cranks, the cranks providing rotational power to drive the rotating wheel to rotate with the force-receiving members and via the rotating axle;
   a first driving device;
   a driving device seat;
   an exposed rotor axle;
   an exposed second driving device; and
   an auxiliary motor installed between the two cranks on the two ends of the rotating axle, with an electromagnetic field parallel to an axle core of the rotating axle, wherein output power of the auxiliary motor combines with the rotational power provided by the rotating axle to synchronically drive the rotating wheel to rotate, the rotating axle providing rotational power to drive the rotating wheel to rotate through the first driving device and the driving device seat, while the auxiliary motor provides the output power by the exposed rotor axle and the exposed second driving device, and the first and second driving devices are rotationally installed on the rotating axle through the driving device seat.

9. The motor assisted rotating wheel mechanism of claim 8, further comprising:

one of a chain wheel and a pulley; and a unidirectional ratchet, wherein the rotating axle connects to the one of the chain wheel and the pulley through the unidirectional ratchet.

10. The motor assisted rotating wheel mechanism of claim 8, wherein the auxiliary motor is equipped with a rotor and a stator, and the rotor is located in a central region inside the auxiliary motor while the stator is located in an outer region inside the auxiliary motor, so as to form one or more active surfaces of magnetic flux.

11. The motor assisted rotating wheel mechanism of claim 10, further comprising a bearing, wherein the rotor has a permanent magnet and a rotor seat for carrying the permanent magnet, and the rotor seat connects to a casing of the auxiliary motor by the bearing.

12. The motor assisted rotating wheel mechanism of claim 10, wherein the rotor has a permanent magnet and a rotor seat for carrying the permanent magnet, and the stator has a stator core, formed by silicon steel slices, and a winding set wound around the stator core.

13. The motor assisted rotating wheel mechanism of claim 12, further comprising:

one of a profile shaft, a key connection and buckles, wherein the rotor seat is coupled to the driving device seat through the one of the profile shaft, the key connection and the buckles.

14. The motor assisted rotating wheel mechanism of claim 10, wherein the auxiliary motor is further provided with a position sensor installed on the stator or the rotor.

15. The motor assisted rotating wheel mechanism of claim 8, wherein the auxiliary motor is equipped with a rotor and a stator, and the stator is located in a central region inside the auxiliary motor while the rotor is located in an outer region inside the auxiliary motor, so as to form one or more active surfaces of magnetic flux.

16. The motor assisted rotating wheel mechanism of claim 8, wherein the auxiliary motor is installed inside the frame body.

17. The motor assisted rotating wheel mechanism of claim 8, further comprising a rotating axle seat, wherein the rotating axle is rotationally installed in the frame body through the rotating axle seat.

* * * * *